Feb. 10, 1948.  A. R. E. A. PERREAU  2,435,599
METALLIC CUSHION TIRE
Filed Sept. 1, 1942  2 Sheets-Sheet 1
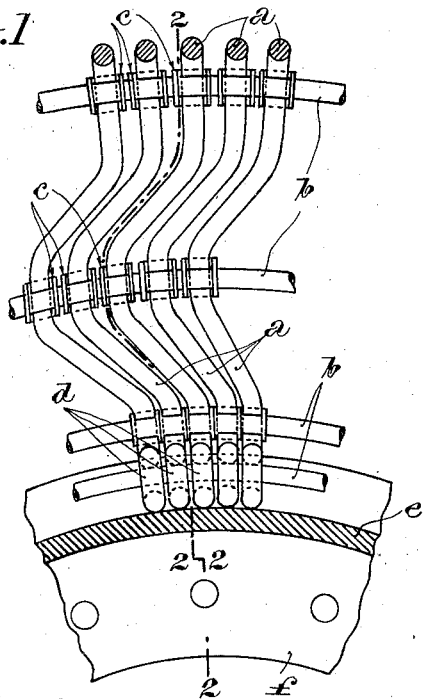
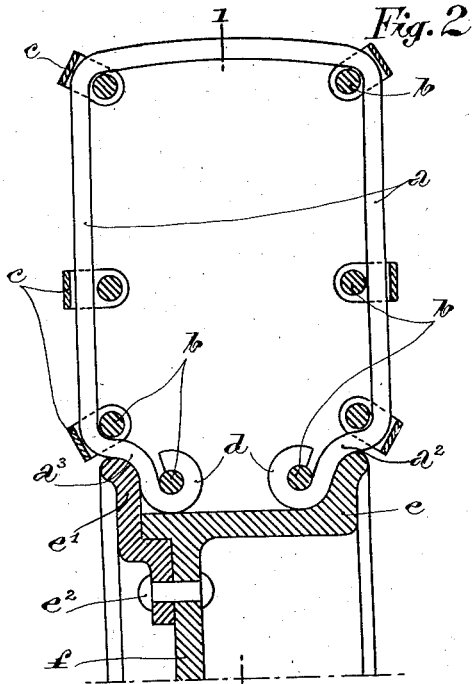
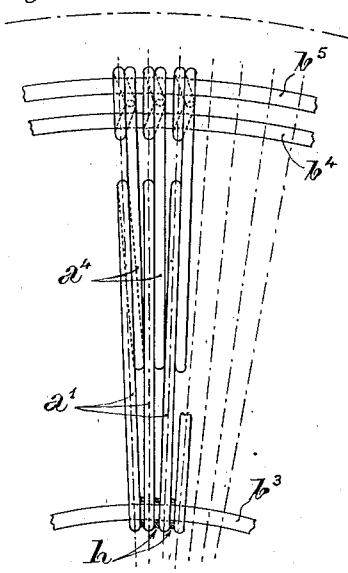
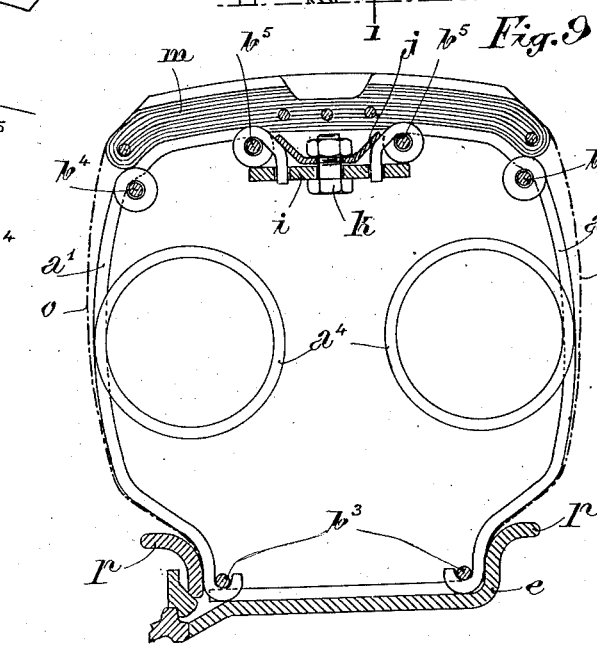
Inventor:
ARMAND RAYMOND ERNEST ANDRÉ PERREAU
By Haseltine Lake & Co.
Attorneys.

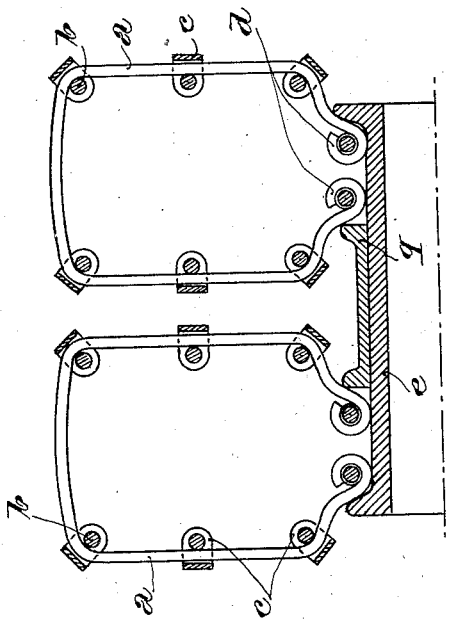
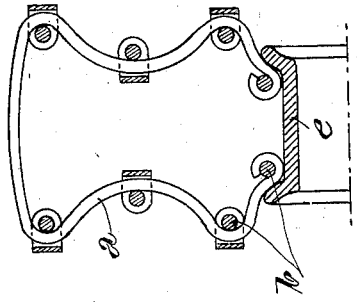
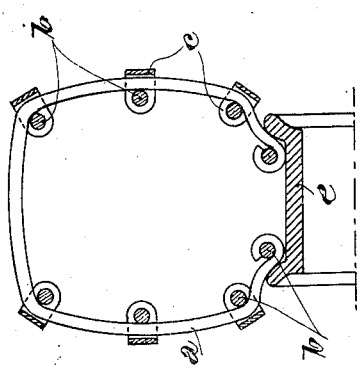
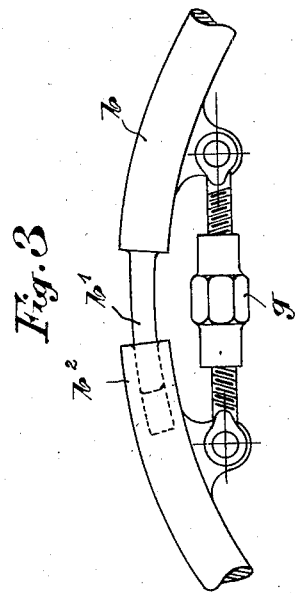
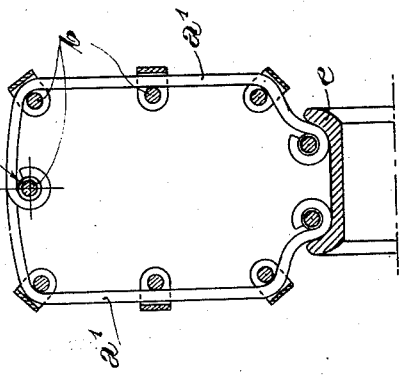
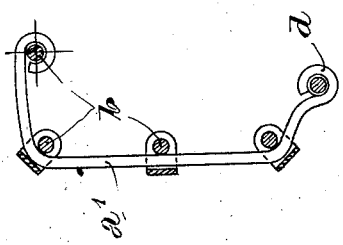

Patented Feb. 10, 1948

2,435,599

UNITED STATES PATENT OFFICE 2,435,599

METALLIC CUSHION TIRE

Armand Raymond Ernest André Perreau, Lyon, France; vested in the Attorney General of the United States Application September 1, 1942, Serial No. 456,846
In France October 23, 1941

2 Claims. (Cl. 152—275)

As is known, the trajectory of every moving vehicle should wherever possible approximate a straight line in order to satisfy requirements so far as the comfort of passengers and proper running conditions of the vehicle are concerned. Where the speed increases, such a condition becomes imperative especially if the ground is uneven or bumpy. The type of vehicle wheel which has given the best results in this respect heretofore is that having a rim provided with a pneumatic tire so as to absorb as it were the unevennesses of the road on which the vehicle travels. In order to obviate the risk of punctures or the call for rubber in the manufacture of tires, numerous elastic wheels comprising no inflatable air tube were devised but they all present more or less serious disadvantages.

The primary object of the present invention is to provide an elastic wheel of novel or improved construction capable of obviating the disadvantages of prior non-pneumatic tire wheels while lending itself to a process of manufacture utilising no substantial quantity of rubber.

Another object of the invention is to provide a wheel comprising an elastic tire or tread made up of a plurality of resilient ring or loop members shaped and juxtaposed so as to build a shock-absorbing annulus or torus and so interconnected as to cause any reactive stress imparted to said annulus by an impact from the ground to be distributed to neighboring ring or loop members whereby a substantial portion of the torus partakes in the balancing of said reactive stress.

A further object of the invention is to provide a wheel comprising an elastic tire or tread made up of a plurality of loop members so interconnected as to cause oscillations derived from an impact of the ground on said tire to be cushioned and damped down by a self braking action so as to prevent said oscillations from being propagated to the whole of the tire.

A still further object of the invention is to provide a wheel comprising an elastic tire or tread made up of a plurality of loop members so interconnected by adjustable connecting means as to allow the cushioning effect of said loop members to be regulated to cope with the load to be carried or the condition of the road, the adjustment thus performed being analogous to the varying degree of inflation of a pneumatic tire.

Still a further object of the invention is to provide an elastic structure as aforesaid possessing resiliency both radially and in a lateral direction, said structure being utilisable either as a complete wheel or as a resilient tire or tread adaptable to existing wheels belonging to types having rigid or semi-rigid treads.

With these and such other objects in view as will incidentally appear hereafter, the invention comprises the novel construction, combination and arrangement of parts that will now be described in detail with reference to the accompanying diagrammatic drawings illustrating embodiments of the same and forming a part of the present disclosure.

In the drawings:

Figure 1 is a fragmentary elevational view partly in section along a plane extending on the line 1—1 of Fig. 2 at right angles to the axis of the wheel hub.

Figure 2 is a fragmentary elevational view partly in section on the line 2—2 of Fig. 1 showing the geometrical projection of one of the ring members included in the wheel structure on a plane extending along the major axis of the wheel hub.

Figure 3 is a separate enlarged view showing a turnbuckle device for adjusting tension on the links or rods that interconnect the ring members involved in the wheel structure.

Figures 4 and 5 are views on a smaller scale similar to Fig. 2 showing constructional modifications of the ring members.

Figures 6 and 7 are further views similar to Figs. 4 and 5 showing as developments of the invention other constructional modifications of the ring members, assuming each of the latter to be made up of a pair of elements.

Figure 8 is a view similar to Fig. 1 showing a further constructional form of the wheel.

Figure 9 is a view similar to Fig. 1 showing the form illustrated in Fig. 8 and an additional rubberized cloth tread over the ring members as well as side coverings therefor.

Figure 10 is a view drawn on the same scale as Figs. 4 to 7 but showing a constructional modification wherein the wheel tire or tread has a twin structure, i. e. comprises a pair of ring member assemblies arranged in parallelism.

Like reference characters designate like parts throughout the several views.

Reference being first had to the constructional form shown in Figs. 1 and 2, it will be seen that the elastic wheel or tire structure comprises a plurality of loop members $a$ arranged side by side substantially parallel to the wheel axis and interconnected by members such as arcuate rods or hoops $b$ circumscribing the rim and arranged at intervals along the internal outline of said loop members so that under ground impacts such members may be temporarily distorted in innumerable planes.

In the embodiments shown, eight hoops or rods $b$ are provided but such a number is not limitative. Advantageously, the loop members $a$ are made of resilient wire (for example steel wire) which may have any convenient cross sectional shape: circular, oval, rectangular or another shape.

Some of the rods $b$ are loosely engaged through fastening members such as U-shaped shackles $c$ encircling the wires $a$, while other rods $b$ are engaged through eye portions $d$ formed on the innerly disposed adjacent ends of the wires $a$.

The end portions of the wires or loop members $a$ are bent at $a^2$, $a^3$ (see Fig. 2) to present outer concavities matching corresponding convexities formed respectively on a rim $e$ and a companion rim flange $e^1$. The rim $e$ is integral with the wheel disk plate $f$ to which the rim flange $e^1$ is bolted at $e^2$.

Each rod or hoop $b$ is advantageously made in two sections as shown in Fig. 3, said sections having loosely interfitting ends $b^1$, $b^2$ and being pivotally interconnected by a chordal turnbuckle device shown diagrammatically and including a nut $g$ by which the degree of interfit may be set to vary the tension of the rods $b$ and wire assembly and thus match requirements. It will be understood that as the nut $g$ is so rotated as to bring the rod male end $b^1$ further into the rod female end $b^2$, the diameter of the entire circular rod or hoop $b$ is lessened and the resiliency of the assembly of loops or wires $a$ is correspondingly altered. Therefore by adjusting the turnbuckle means provided on the wire connecting rods $b$, an action somewhat similar to that achieved when more or less inflating a pneumatic tire may be obtained.

An elastic system made as above described forms a self damped and self contained structure. The damping action results from the mutual frictions of the wires $a$ and rods $b$, while the self contained character results from the bent, looped or elbowed outlines which are given to the flank portions of the loop members $a$ to cause them to rub or abut against one another, particularly in a plane at right angles to the wheel axis, in a region of the inner ends of the elbows.

One feature of the wheel resides in the possibilities of deriving the desired resiliency from the flank portions of the loop members $a$ either by resorting for example to elbowed or chevron outlines as shown in Fig. 1 or by giving said flank portions a convex outline as shown in Fig. 4 or a concave outline as shown in Fig. 5 or else by forming helical turns in said flank portions as shown as $a^4$ in Figs. 8 and 9.

Moreover, as each loop member is the essential resilient component of the elastic wheel, it may be shaped in different ways from a single wire, cord or the like or from a pair of wires, cords or the like as shown for example in Figs. 6 and 7 where two wire elements $a^1$ are coupled at their outer ends as at $i$ and are abutted at their inner ends to correspondingly shaped rim portions. The coupling of the wire elements $a^1$ at their meeting ends may be performed by any means such as by soldering, welding, brazing or otherwise.

In the constructional form shown in Figs. 8 and 9 wherein the flank portions of the separate wire elements $a^1$ are provided with internal helical turns $a^4$, the loop members are interconnected by rod hoops $b^3$, $b^4$, $b^5$ and washers or bushings $h$ (Fig. 8) bestow proper rigidity upon the assembly in view of its adaptation to a rim of known construction. A set of plates $i$, $j$ (Fig. 9) clamped by means of tightening bolts $k$ facilitates the assembly of the wire elements or half loop member $a^1$.

This constructional form also comprises an additional tread $m$ which may be advantageously formed of a multiply rubberized cloth or an equivalent attrition resisting material. It further comprises a pair of flexible coverings such as $o$ which protect the flank portions of the flexible half loop members $a^1$ and are secured to the ends of the tread $m$ and to rim flanges $p$, $p^1$. The coverings $o$ may be made of any yielding or flexible material such for example as rubber, leather, rubberized cloth or gauze. They shroud the assembly from dirt, grit and similar detrimental actions.

An advantage worth mentioning of a tread such as $m$ is that while protecting the assembly it also distributes reactive stresses due to ground impacts to the several loop members to whose outermost portions it is fastened in any suitable manner. A tread such as $m$ is advantageously endowed with anti-skidding properties and improves the running conditions of the vehicle particularly so far as its behavior on the road is concerned.

In the constructional modification shown in Fig. 10, the rim $e$ is provided with two co-extensive parallel sets of loop members $a$, $a$ each of which is built up as above described. An annulus $q$ is provided on the rim $e$ intermediate the adjacent ends of both loop member sets so that they can be properly abutted thereagainst.

It will be understood that the invention may be applied either to the construction of a complete wheel or to the construction of an annulus or torus having the aforesaid structure and adaptable to a readily made rim and hub assembly, in which case the torus will be used instead of a pneumatic tire.

It will be further understood that the words "wires" and "links" used in this specification must be construed in a broad sense as involving all equivalents. Thus the word "wires" also involves the meaning of cords and cables, while the word "links" involves the meaning of rods, bars and similar elongated members capable of playing the same function in resiliently interconnecting the ring members.

Minor constructional details might be changed, moreover, without departing from the scope of the subjoined claims.

What is claimed is:

1. An elastic wheel comprising a rim supported from a hub, a plurality of flexible members arranged side by side, bulging outwardly from the rim, and having curved end portions remote from the rim forming the wheel tread, and having substantially radially disposed portions intermediate the rim and tread lying substantially in the planes of the outer and inner faces of the wheel, said intermediate portions being bent to form elbows also lying in said planes, said elbows being capable of temporary resilient distortion in innumerable planes responsive to ground impacts on the said end portions of the members, said elbows also being so closely spaced at their inner ends that said ends are caused to contact one another to form substantially unyielding structure at the impact regions in the planes of said inner and outer wheel faces, rods circumscribing the rim, and means for slidably and frictionally interconnecting said rods to said members whereby the oscillations derived from an impact of the wheel with the ground will be damped by said frictional interconnecting means.

2. An elastic wheel as defined in claim 1 further comprising means associated with each of said rods for exerting adjustable tension thereon to thereby selectively vary the combined shock-absorbing capacity of the members.

ARMAND RAYMOND
ERNEST ANDRÉ PERREAU.

REFERENCES CITED

The following references are of record in the file of this patent:

UNITED STATES PATENTS

| Number | Name | Date |
| --- | --- | --- |
| 1,020,464 | Temple | Mar. 19, 1912 |
| 909,978 | Wilmot | Jan. 19, 1909 |
| 1,142,279 | Stephens | June 8, 1915 |
| 971,267 | Greenewald | Sept. 27, 1910 |
| 1,229,861 | Auberlin | June 12, 1917 |
| 522,141 | Ballantine | June 26, 1894 |
| 1,138,129 | Lyons | May 4, 1915 |
| 633,685 | Conatser | Sept. 26, 1899 |
| 982,453 | Willis | Jan. 24, 1911 |
| 1,420,158 | Stanfield | June 20, 1922 |
| 1,120,514 | Mendenhall | Dec. 8, 1914 |

FOREIGN PATENTS

| Number | Country | Date |
| --- | --- | --- |
| 17,463 | Great Britain | Apr. 24, 1902 |